(12) United States Patent
Götzenberger

(10) Patent No.: US 7,675,277 B2
(45) Date of Patent: Mar. 9, 2010

(54) MULTIPHASE DC CHOPPER AND METHOD FOR OPERATING A MULTIPHASE DC CHOPPER

(75) Inventor: Martin Götzenberger, Ingolstadt (DE)

(73) Assignee: Siemens Aktiengesellschaft, Munich (DE)

(*) Notice: Subject to any disclaimer, the term of this patent is extended or adjusted under 35 U.S.C. 154(b) by 740 days.

(21) Appl. No.: 11/526,924

(22) Filed: Sep. 26, 2006

(65) Prior Publication Data

US 2007/0069704 A1    Mar. 29, 2007

(30) Foreign Application Priority Data

Sep. 26, 2005   (DE) ................... 10 2005 045 889

(51) Int. Cl.
*H02J 1/04* (2006.01)
*G05F 1/46* (2006.01)

(52) U.S. Cl. .................. 323/272; 363/65; 363/124

(58) Field of Classification Search .............. 323/222, 323/225, 268, 271, 272, 282, 284, 350, 351; 363/65, 124

See application file for complete search history.

(56) References Cited

U.S. PATENT DOCUMENTS

| | | | | |
|---|---|---|---|---|
| 5,371,667 A | * | 12/1994 | Nakao et al. ................ | 363/124 |
| 6,034,514 A | * | 3/2000 | Sakai ......................... | 323/225 |
| 6,839,252 B2 | | 1/2005 | Tai et al. | |
| 6,980,445 B2 | * | 12/2005 | Fukumoto et al. ............ | 363/45 |
| 7,116,087 B2 | * | 10/2006 | Zhang et al. ................ | 323/272 |
| 7,342,386 B2 | * | 3/2008 | Wildash ..................... | 323/272 |
| 2004/0145922 A1 | | 7/2004 | Jutras et al. | |

FOREIGN PATENT DOCUMENTS

| | | |
|---|---|---|
| EP | 1 109 303 A2 | 6/2001 |
| EP | 1 513 247 A1 | 3/2005 |

* cited by examiner

*Primary Examiner*—Gary L Laxton
(74) *Attorney, Agent, or Firm*—Laurence A. Greenberg; Werner H. Stemer; Ralph E. Locher

(57) ABSTRACT

A multiphase DC chopper converts an input voltage of an input capacitor into an output voltage of an output capacitor. The multiphase DC chopper has a plurality N of DC choppers connected in parallel between the input capacitor and the output capacitor in which case the nth DC chopper, with $n \in [1, \ldots, N]$, providing on its output side an nth charge current for charging the output capacitor. A regulation device, which in each case regulates a phase difference signal of two charge currents, which sequentially charge the output capacitor to a value of 360°/N.

9 Claims, 6 Drawing Sheets

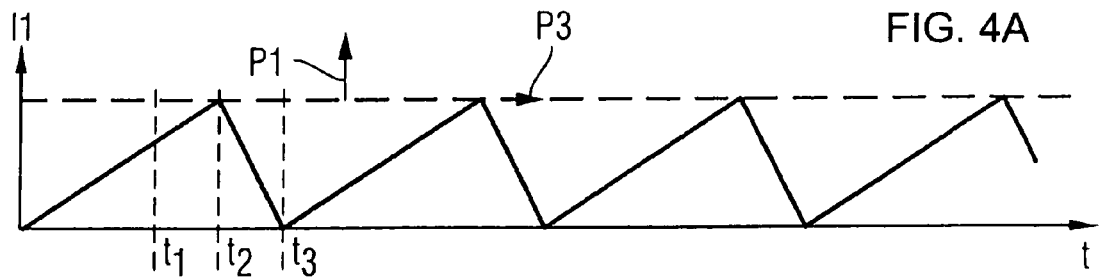
FIG. 4A
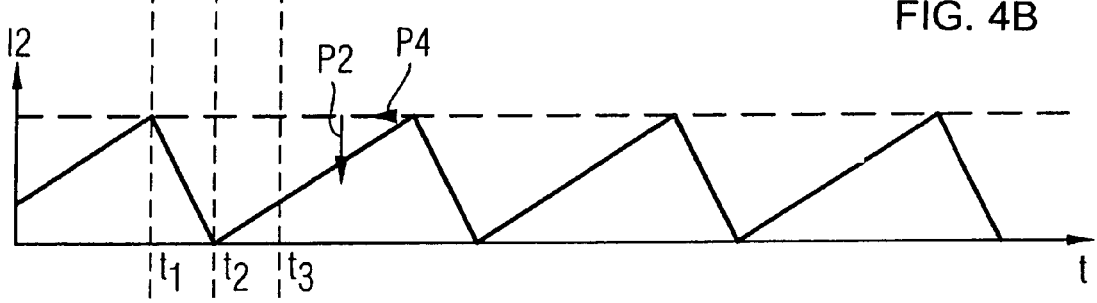
FIG. 4B
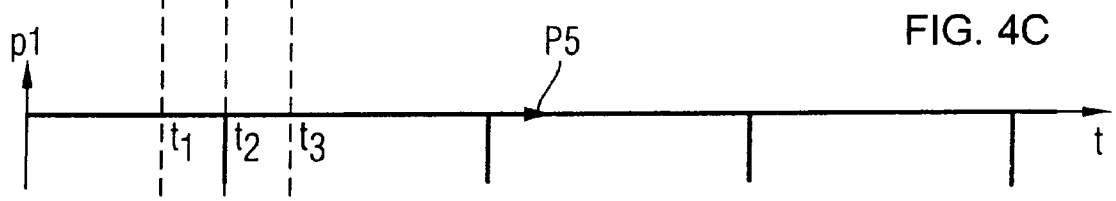
FIG. 4C
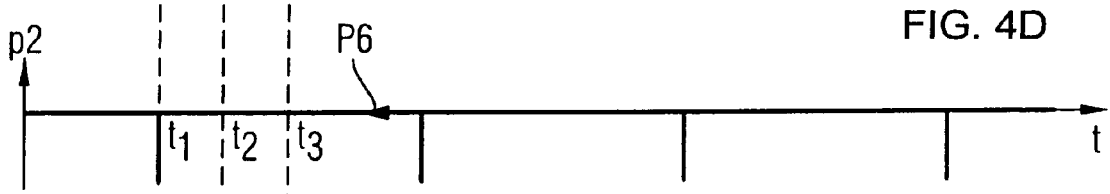
FIG. 4D
FIG 4E
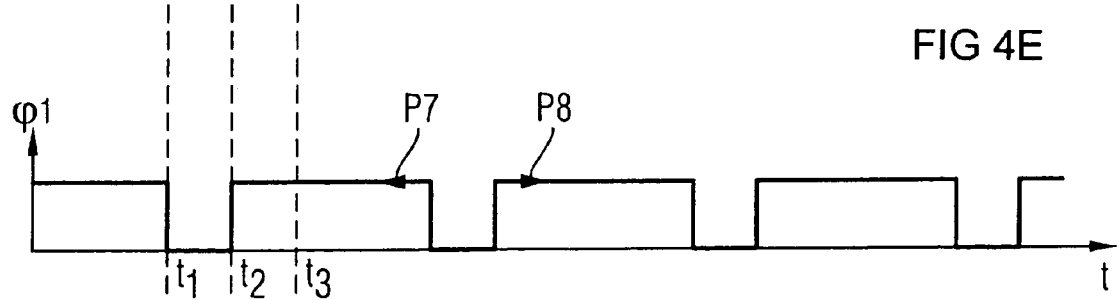
FIG. 4F
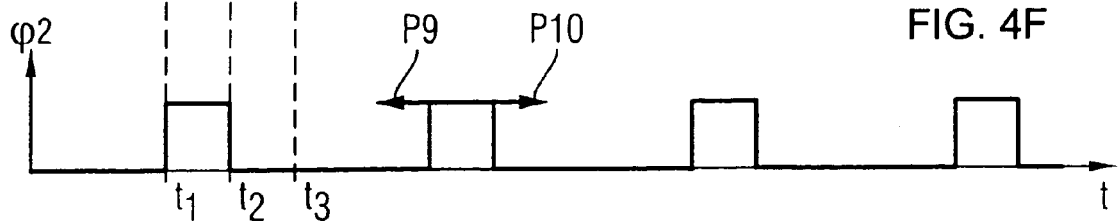

MULTIPHASE DC CHOPPER AND METHOD FOR OPERATING A MULTIPHASE DC CHOPPER

CROSS-REFERENCE TO RELATED APPLICATION

This application claims the priority, under 35 U.S.C. §119, of German application DE 10 2005 045 889.0, filed Sep. 26, 2005; the prior application is herewith incorporated by reference in its entirety.

BACKGROUND OF THE INVENTION

Field of the Invention

The invention relates to a multiphase DC chopper, which converts an input voltage of an input capacitor into an output voltage of an output capacitor.

With modern internal combustion engines with fuel injection the need arises to supply the injection valves with a short current impulse at a high current intensity. The output capacitor acts as a capacitive energy accumulator, for example for the injection valve of the internal combustion engine.

In the supply of energy to an injection valve by the output capacitor of the DC chopper, electromagnetic compatibility (EMC) represents an important criterion in the configuration of the DC chopper.

There are many topologies and methods of operation known for the implementation of the DC chopper or DC/DC converter. Depending on the power and EMC behavior requirements of the DC chopper to be provided multiphase converters are also used. However single-phase converters or DC choppers have the advantage, of being able to be operated at the boundary of the intermittent direct current. The intermittent DC boundary in this case designates the boundary between the intermittent and non-intermittent operation. Operation at the intermittent DC boundary is marked by a particularly good EMC behavior, especially in the high-frequency operating range, in which measures for reduction of faults that have a negative effect on the electromagnetic compatibility can only be implemented at great expense.

Operation at the intermittent DC boundary means however that there is a fixed relationship between the operating frequency, the input voltage, the output voltage and required current value of the DC chopper. This fixed relationship initially conflicts with the use of a multiphase DC chopper, which is used to increase power while simultaneously reducing low-frequency ripple currents. If for example one stage of the multiphase DC chopper is drawing current, the operation of the multiphase DC chopper at the intermittent DC boundary is conventionally no longer possible because of the dependence of the relevant frequencies or operating frequencies on the stages of the DC chopper on the respective current drawn.

SUMMARY OF THE INVENTION

It is accordingly an object of the invention to provide a multiphase DC chopper and a method for operating a multiphase DC chopper which overcomes the above-mentioned disadvantages of the prior art devices and methods of this general type, which can operate at the intermittent DC current boundary.

With the foregoing and other objects in view there is provided, in accordance with the invention, a multiphase DC chopper. The multiphase DC chopper having an input capacitor providing an input voltage, an output capacitor outputting an output voltage converted from the input voltage, and a plurality N of DC choppers connected in parallel between the input capacitor and the output capacitor. An nth one of said DC choppers, with $n \in [2, \ldots, N]$, having an output outputting a nth charge current for charging the output capacitor. A regulation device regulates a phase difference signal of two charge currents sequentially charging the output capacitor to a value of $$\frac{360°}{N}.$$

With conventional free-running DC/DC converters or DC choppers, as represented by any converter which operates at the intermittent DC boundary, the frequency change as a function of the current bias is accepted as an unavoidable disadvantage. The idea now underlying the invention is to utilize this effect for frequency control. The phase position of two DC choppers of the multiphase DC chopper to each other is used in each case to generate a control signal for the required current value. A phase locked loop is thereby closed and the desired phase angle of the plurality N of DC choppers is retained. In this case the phase of one DC chopper of the multiphase DC chopper is not regulated so that this has a desired relationship to a master oscillator. In accordance with the invention all converters or DC choppers of the multiphase DC chopper are regulated such that the phase difference of the charge currents of two DC choppers, which charge the output capacitor sequentially, have a value of $$\frac{360°}{N}.$$

Advantageously the present invention combines the advantages of a multiphase DC chopper or voltage converter and the advantages of the operation at the intermittent DC boundary. The advantage of a multi-phase voltage converter, by contrast to the single-phase voltage converter which delivers an equally high output current on the output side, lies especially in the fact that the effective current values of the input capacitance and the output capacitance of the multi-phase DC chopper are far lower than with a single-phase converter.

Advantageously operation at the intermittent DC boundary also combines the advantage of intermittent operation and an advantage of non-intermittent operation. The advantage of intermittent operation lies particularly in the fact that the active transistor is switched at points in time in which the free running diode of the DC chopper is at zero current. At such a point there is especially also no current chopping in the diode and a good EMC behavior of the DC chopper is ensured. The advantage of non-intermittent operation lies especially in the fact that the charge current is not equal to zero in any time range and thus no time range remains unused for the charging of the capacitor. Operation at the intermittent DC boundary thus represents an optimum compromise between the efficiency of the multiphase DC chopper and its EMC behavior.

In accordance with a preferred further development of the invention, the nth DC chopper features a peak current detection device which provides a peak current detection signal if the charge current of the nth DC chopper is greater than a predetermined required current value signal for the nth DC chopper.

In accordance with a further preferred development the regulation device features at least one first RS flip-flop which at least provides for the nth DC chopper with an nth phase different signal from a phase difference between the nth peak current detection signal and the (n+1)th peak current detection signal on the output side. The peak current detection signals of the peak parent detection devices of the individual DC choppers are thus used to provide the relevant phase differences of the charge currents which charge the output capacitors sequentially. By use of the phase differences provided, a synchronization of the individual DC choppers of the multi-phase DC chopper is then possible, in which case the relevant phase differences of the sequential charge currents each have a value of $$\frac{360°}{N}.$$

In accordance with a further preferred development the nth peak current detection device includes a first resistor which, depending on the nth charge current which is provided on the output side by an inductive element of the nth DC chopper, provides the required current value signal; and a first filter device which filters the required current value signal and provides a filtered required current value signal on the output side. A second filter device is provided which filters the predetermined required current value signal and provides a filtered required current value signal on the output side. A comparator is further provided and which on the input side, at its positive input receives the filtered required current value signal and at its negative input receives the filtered actual current value signal and on the output side sets the peak current detection signal to a negative logical signal level if the filtered actual current value signal is greater than the filtered required current value signal.

Advantageously the first filter device and the second filter device filter out faults of the actual current value signal provided or the predetermined required current value signal respectively.

In accordance with a further preferred development the nth DC chopper features a ring-back detection device which measures a switch voltage of a controllable power switch on free running of the nth charge current via a free running diode of the nth DC chopper and on the output side sets a ring-back detection signal to a negative logical signal level if the measured switch voltage is smaller than a predetermined voltage threshold. Advantageously negative signal levels are especially used in the present invention for the various signals since the preferred comparators that are used to convert the analog signal into a digital signal react more quickly for a signal that leads to falling edges of the output signal. This produces speed advantages.

In accordance with a further preferred development, the nth DC chopper has a control circuit which on its input side receives the peak current detection signal and a ring-back detection signal and on its output side provides a control signal, in which case the control circuit sets the control signal to a negative logical signal level if the peak current detection signal has the negative logical signal level and resets it if the ring-back detection signal has the negative logical signal level. A driver device is provided and which on its input side receives the control signal and on its output side provides a switching signal that switches on the power switch if the control signal has a negative logical signal level and switches off if the control signal does not have the negative logical signal level.

In accordance with a preferred embodiment of the invention the control circuit features a second RS flip-flop that receives the peak current detection signal at its set input and the ring-back detection signal at its reset input. Advantageously the control signal for activating the driver device is generated by the second RS-flip-flop from the peak current detection signal and the ring-back detection signal. In particular the control signal is set by the ring-back detection signal and reset by the peak current detection signal.

In accordance with a further preferred embodiment the first RS flip-flop and/or the second RS flip-flop are constructed from NAND gates. Advantageously NAND gates and a corresponding negative logic are used since NAND gates are widely available and thereby particularly cheap. In addition pre-wired RS flip-flops and NAND gates are available.

In accordance with a further preferred embodiment the first RS flip-flop sets the nth phase difference signal to a positive logical signal level if the nth peak current detection signal has the negative logical signal level and to a negative logical signal level if the (n+1)th peak current detection signal has the negative logical signal level.

In accordance with a further preferred embodiment the regulation device features a required current value generator that has the number N of RC elements, in which case the nth RC element provides an nth required current value signal depending on the nth phase difference signal provided. In particular the nth RC element forms an average value of the nth phase difference signal provided and thus provides an nth analog required current value.

In accordance with a further preferred embodiment the second filter device is embodied as a series circuit disposed between the required current value generator and ground. The second filter device has a second resistor and a third resistor connected in parallel to a capacitor.

Other features which are considered as characteristic for the invention are set forth in the appended claims.

Although the invention is illustrated and described herein as embodied in a multiphase DC chopper and a method for operating a multiphase DC chopper, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 4A-4F are graphs showing an inventive regulation of two DC choppers of two-phase DC chopper of which the phase difference is not equal to 180°;

DESCRIPTION OF THE PREFERRED EMBODIMENTS

Figure 1:
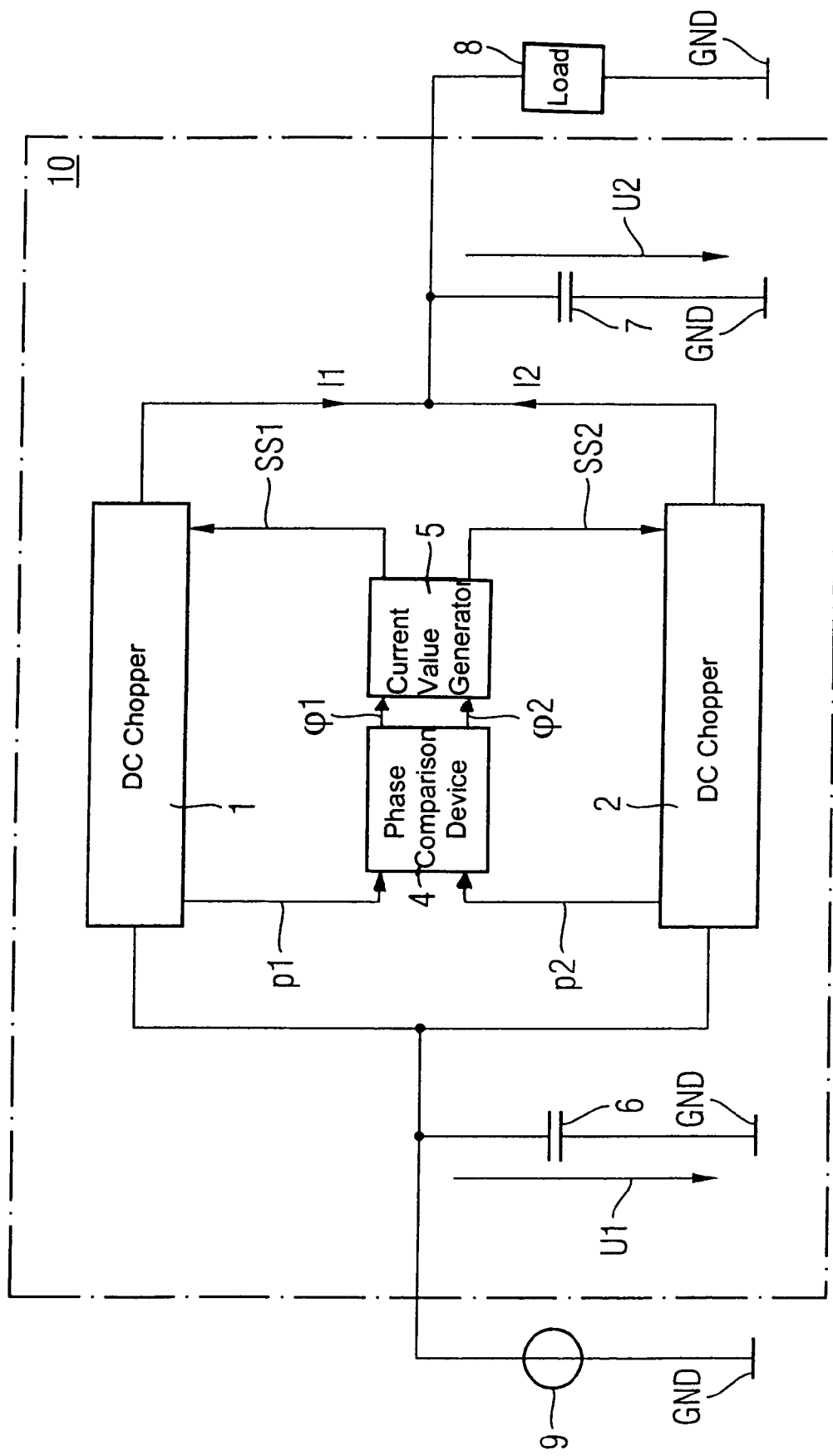
FIG. 1 is a schematic block diagram of a first exemplary embodiment of a multiphase DC chopper according to the invention.

In all the figures of the drawing, sub-features and integral parts that correspond to one another bear the same reference symbol in each case. Referring now to the figures of the drawing in detail and first, particularly, to FIG. 1 thereof, there is shown a schematic block diagram of a first exemplary embodiment of an inventive multiphase DC chopper 10. Without restricting its general applicability, the multi-phase DC chopper is embodied as a two-stage DC chopper (N=2) in accordance with the first exemplary embodiment. The first exemplary embodiment in accordance with FIG. 1 shows the two-stage DC chopper 10, which features a first DC chopper 1 as a first stage or first phase and a second DC chopper 2 as second stage or second phase 2.

The first DC chopper 1 and the second DC chopper 2 are connected in parallel between an input capacitor 6 and an output capacitor 7. The input capacitor 6 is preferably connected in parallel to an energy supply device 9, for example a battery. The energy supply device 9 supplies the input capacitor 6 with energy, so that an input voltage U1 is present at the capacitor 6. The multiphase DC chopper 10 converts the input voltage U1 into an output voltage U2. The output capacitor 7 acts as an energy accumulator. The converted output voltage U2 is present at the output capacitor 7. A load 8 is supplied with energy by the stored output voltage U2. The load 8 is for example embodied as an injection valve of an internal combustion engine of an automobile. In this case the load can be either capacitive or inductive, especially a piezoelectric actuator.

Furthermore the inventive multiphase DC chopper 10 features a regulation device, which is preferably embodied from a phase comparison device 4 and a required current value generator 5.

The first DC chopper 1 provides a first oscillating charge current I1 on its output side and the second DC chopper 2 provides a second oscillating charge current I2 on its output side. The first charge current I1 and the second charge current I2 charge the output capacitor 7.

The first DC chopper 1 further provides a peak current detection signal p1 on the output side, if the first charge current I1 is greater than a required current value predetermined for the first DC chopper 1. Likewise the second DC chopper converter 2 provides a peak current detection signal p2 if the second charge current I2 is greater than a required current value predetermined for the second DC chopper converter 2. The phase comparison device 4 receives on its input side the peak current detection signals p1 and p2 of the first charge current I1 and of the second charge current I2 and on its output side provides a first phase difference signal (φ1 and a second phase difference signal φ2. The first phase difference signal φ1 is produced by the difference between the first peak current detection signal p1 and the second peak current detection signal p2. Preferably the first phase difference signal φ1 is set by the first peak current detection signal p1 and reset by the second peak current detection signal p2. The second phase difference signal φ2 on the other hand is set by the second peak current detection signal p2 and reset by the first peak current detection signal p1.

The required current value generator 5 provides a first required current value signal SS1 on its output side depending on the first phase difference signal φ1 and a second current value-signal SS2 depending on the second phase difference signal φ2.

The first DC chopper 1, the phase comparison device 4 and the required current value generator 5 form a first phase regulation circuit. The second DC chopper 2, the phase comparison device 4 and the required current value generator 5 form a second phase regulation circuit. By use of the first required current value signal SS1 and the second required current value signal SS2 the first DC chopper 1 and the second DC chopper 2 are regulated so that the phase difference signal of the two charge currents I1 and I2 has a value of 180°. The two-stage DC chopper 10 shown in FIG. 1 features two (N=2) DC choppers 2, so that—as shown—a regulation variable of $$\frac{360°}{N} = 180°$$

is produced.

Figure 2:
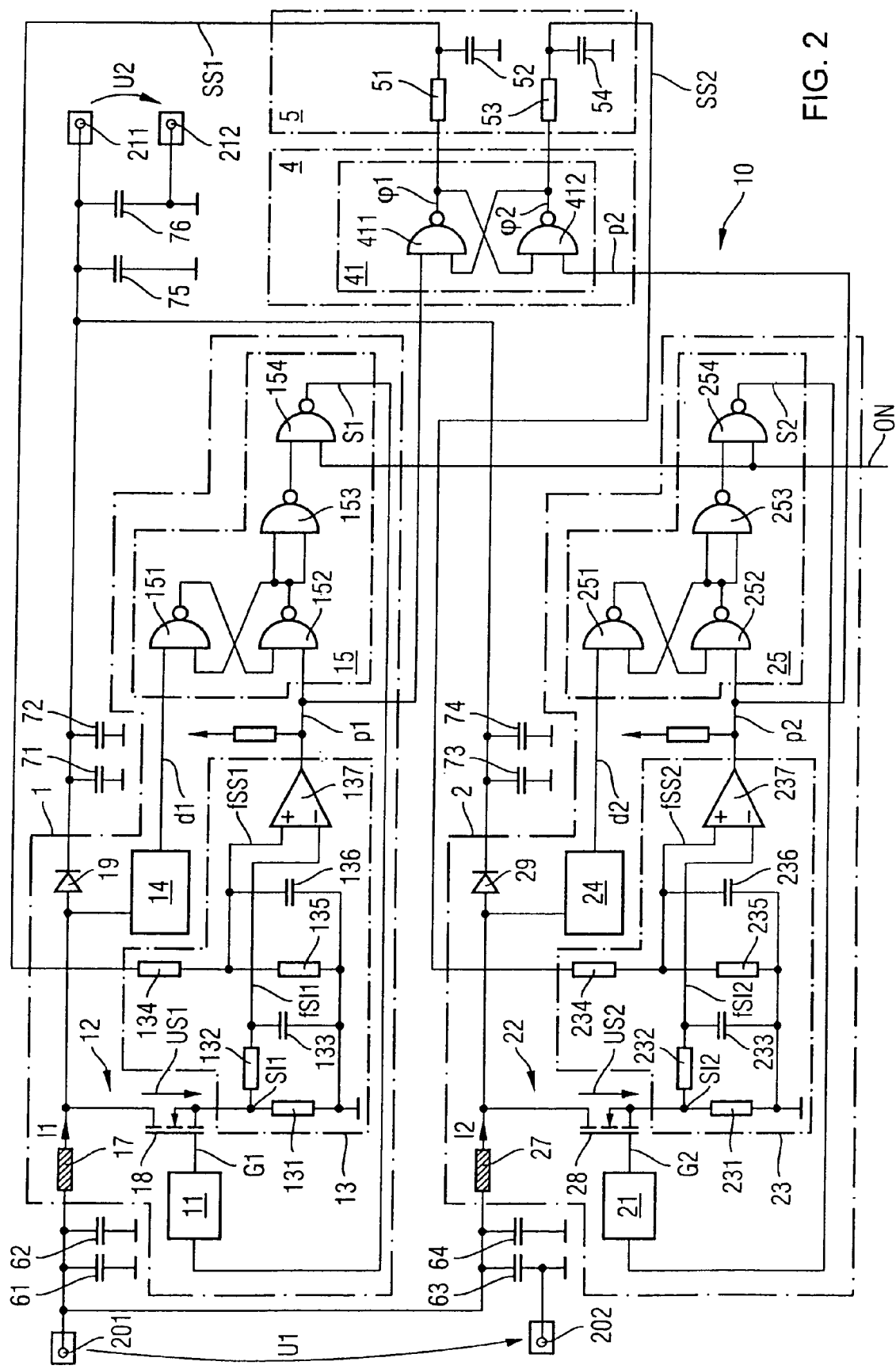
FIG. 2 is a schematic diagram of a second exemplary embodiment of the inventive multiphase DC chopper.

FIG. 2 shows a preferred exemplary embodiment of the two-stage DC chopper 10 shown in FIG. 1. The components and signals, such as resistors or capacitors, are referenced by their reference symbols below.

As in FIG. 1, the inventive two-stage DC chopper 10 features the first DC chopper 1 and the second DC chopper 2. Preferably the first DC chopper 1 and the second DC chopper 2 are embodied as identical configurations. Only the first DC chopper 1 is described below. The same then applies to the identical second DC chopper 2.

The first DC chopper 1 features an inductive control element 17, for example a choke or a coil, a controllable power switch 18, for example a MOSFET or an IGBT, and a free-wheeling diode 19. The inductive control element 17, the controllable power switch 18 and the free-wheeling diode 19 form a startup control 12.

The input voltage U1 is present between input terminals 201 and 202. The output voltage U2 is present between output terminals 211 and 212. The input capacitor 6 is embodied from a parallel circuit of the capacitors 61, 62, 63 and 64. In this case the capacitors 61 and 62 represent electrolytic capacitors and the capacitors 62 and 64 are ceramic capacitors. The output capacitor is embodied as a parallel circuit of the capacitors 71 to 76. In this case the capacitors 71 to 74 are embodied as ceramic capacitors and the capacitors 75 and 76 as electrolytic capacitors.

Furthermore the first DC chopper 1 features a peak current detection device 13 which provides a peak current detection signal p1 if the first charge current I1 of the first DC chopper 1 is greater than a required current value signal SS1 predetermined for the first DC chopper 1. Preferably in this case the first peak current detection device 13 features a first resistor 131 which, depending on the first charge current I1, which is provided on the output side by the inductive control element 17 provides a current actual value signal SI1. Thus the first charge current I1 is measured by the first resistor 131 if the power switch 18 is switched on. The first resistor 131 thus acts as a shunt.

Furthermore the first peak current detection device 13 features a first filter device 132, 133. Preferably the first filter device 132, 133 is embodied as an RC element featuring a resistor 132 and a capacitor 133. The RC element 132, 133 filters the actual current value signal SI1 and provides a filtered actual current value signal fSI1 on the output side.

In addition the first peak current detection device 13 features a second filter device 134-136 which filters the predetermined required current value signal SS1 and provides a filtered required current value signal fSS1 on the output side. Preferably the second filter device 134-136 is embodied as a series circuit of a second resistor 134 disposed between the required current value generator 5 and ground GND and of a third resistor 135 connected in parallel to a capacitor 136.

Furthermore the first peak current detection device 13 preferably features a comparator 137. The comparator 137 receives on its input side, especially at its non-inverting input, the filtered required current value signal fSS1 and at its inverting input the filtered actual current value signal fSI1. If the filtered actual current value signal fSI1 is greater than the filtered required current value signal fSS1, the comparator 137 sets the peak current detection signal p1 on its output side to a negative logical signal level.

In addition the first DC chopper 1 features a ring-back detection device 14. The ring-back detection device 14 measures a switch voltage US1 of the controllable power switch 18 on free running of the first charge current I1 via the freewheeling diode 19. If the measured switch voltage US1 is less than a predetermined voltage threshold the ring-back detection device 14 sets a ring-back detection signal d1 on its output side to a negative logical signal level. Preferably a negative logic is used, since downstream logic or control units have shorter reaction times, especially with falling edges. Significant speed advantages are thus produced for the inventive multiphase DC chopper 10 in the regulation or synchronization of the individual DC conversion phases 1, 2.

Furthermore the first DC chopper 1 preferably features an activation circuit 15. The activation circuit 15 receives on its input side the peak current detection signal p1 and the ring-back detection signal d1 and provides a control signal S1 on its output side. Preferably the control circuit 15 sets the control signal S1 to a logical negative signal level, if the peak current detection signal p1 has the negative logical signal level and set the control signal S1 to a positive logical signal level if the ring-back detection signal d1 has the negative logical signal level. The control circuit 15 especially features a second RS flip-flop 151, 152 which receives at its set input the peak current detection signal p1 and at its reset input the ring-back detection signal d1. The second RS flip-flop 151, 152 is especially constructed from two NAND gates 151, 152. Furthermore the control circuit 15 features a NAND gate 153 for inversion of the output signal of the NAND gate 152. Downstream from the NAND gate 153 is connected a further NAND gate 154 which receives at its inputs on the one hand the output signal of the NAND gate 153 and a switch-on signal ON. The two-stage DC chopper 10 can be switched on and off by the switch-on signal ON. On its output side the NAND gate 154 then provides the control signal S1.

Furthermore the first DC chopper 1 features a driver device 11 which on its input side receives the control signal S1 and on its output side provides a switching signal G1 which switches on the power switch 18 if the control signal S1 has a negative logical signal level and switches it off if the control signal S1 does not have the negative logical signal level.

Preferably the regulation device 4, 5 features at least a first RS flip-flop 41 which receives on its inputs side the peak current detection signal p1 of the first DC chopper 1 and the peak current detection signal p2 of the second DC chopper 2 and on its output side provides a first phase difference signal ϕ1 for the first DC chopper 1 and a second phase difference signal ϕ2 for the second DC chopper 2. The first phase difference signal ϕ1 is produced from a difference between the first peak current detection signal p1 and the second peak current detection signal p2. The second phase difference signal ϕ2 is produced from a difference between the second peak current detection signal p2 and the first peak current detection signal p1. Preferably the phase comparison device 4 for a two-stage DC chopper 10 features precisely one single RS flip-flop 41 which provides both phase difference signals ϕ1 and ϕ2. The RS flip-flop 41 is constructed from two NAND gates 411, 412. Preferably the RS flip-flop 41 sets the first phase difference signal ϕ1 to a positive logical signal level if the first peak current detection signal p1 has the negative logical level and to a negative logical signal level if the second peak current detection signal p2 has the negative logical signal level p2. The reverse then applies to the second phase difference signal ϕ2.

In addition the regulation device 4, 5 preferably features a required current value generator 5 which features a number of N=2 of RC elements 51, 52; 53, 54. The first RC element 51, 52 provides the first-required current value signal SS1 depending on the first phase difference signal ϕ1 provided. The second RC element 53, 54 provides the second required current value signal SS2, depending on the second phase difference signal ϕ2.

Figure 3:
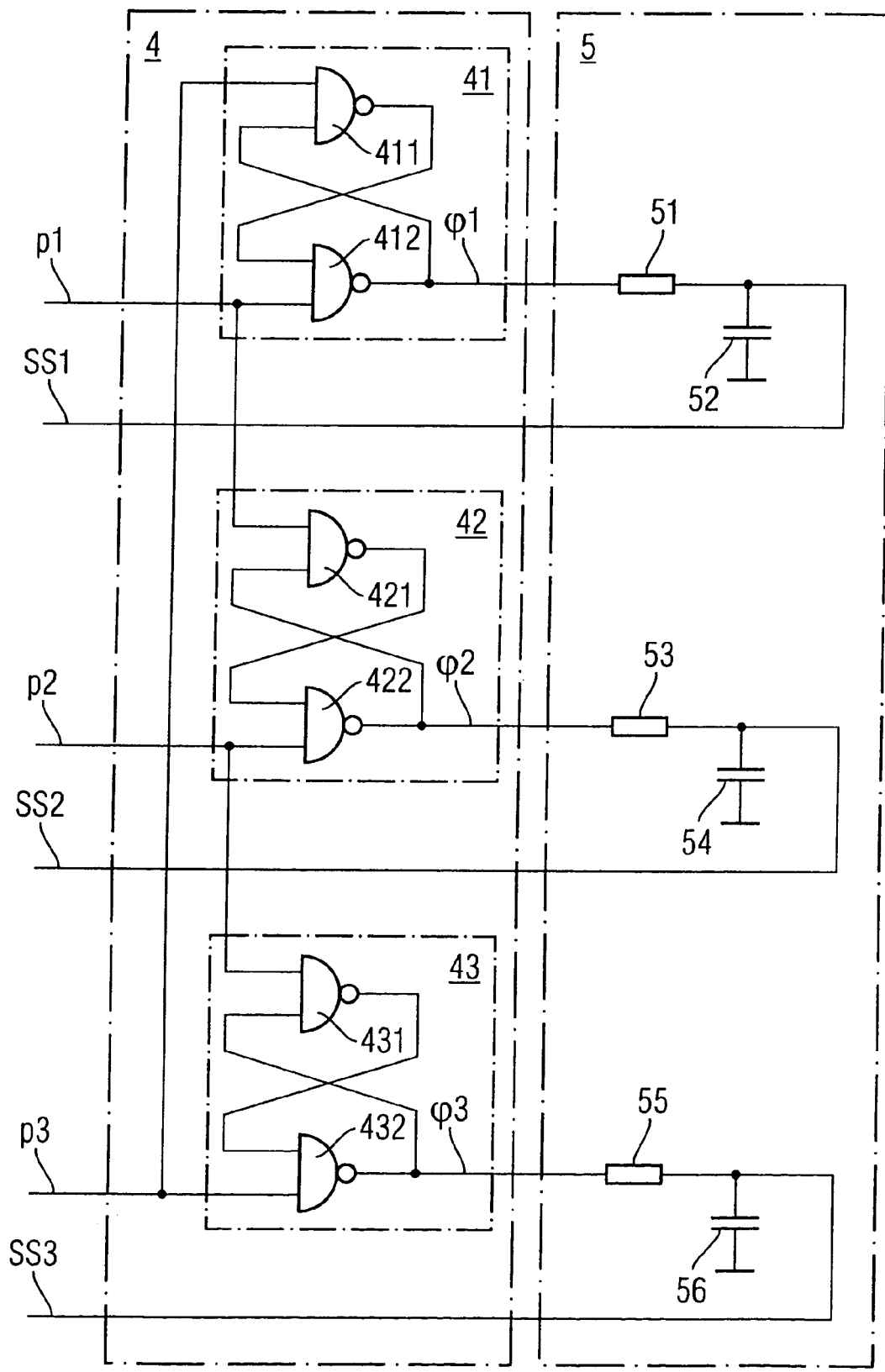
FIG. 3 is a schematic diagram of an exemplary embodiment of a regulation device of a three-phase DC chopper according to the invention.
Figure 5A:
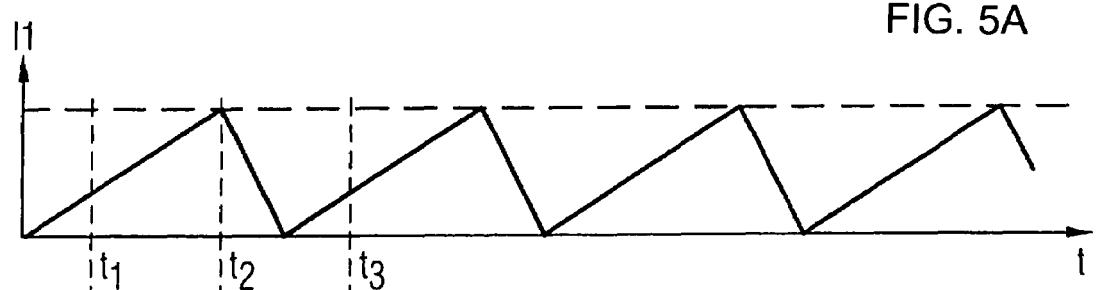
FIGS. 5A-5F are graphs of the two DC choppers shown in FIGS. 4A-4F in a regulated state.
Figure 5B:
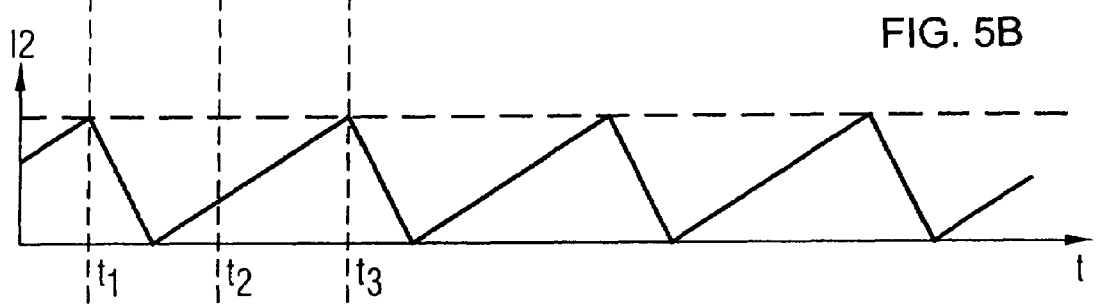
Figure 5C:
Figure 5D:
Figure 5E:
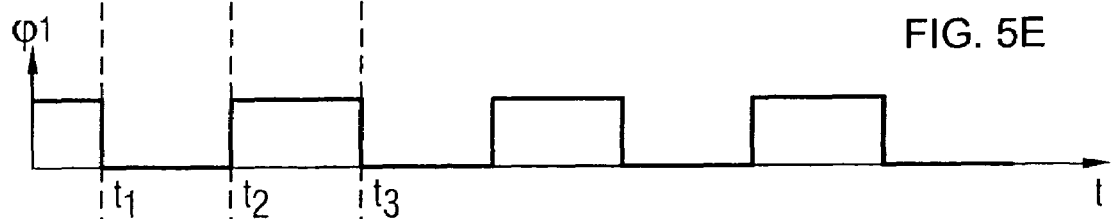
Figure 5F:
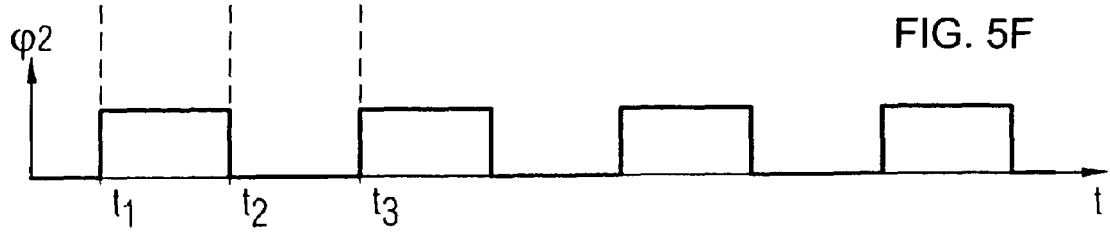

FIG. 3 shows a schematic block diagram of an exemplary embodiment of the regulation device 4, 5 of a three-phase DC chopper in accordance with the present invention. In this case the three-stage DC chopper is formed of a first DC chopper, a second DC chopper and a third DC chopper. Consequently the first peak current detection signal p1 and the first required current value signal SS1 relate to the first DC chopper, the second peak current detection signal p2 and the second required current value signal SS2 to the second DC chopper and the third peak current detection signal p3 and the third required current value signal SS3 to the third DC chopper Preferably the phase comparison device 4 features the RS flip-flops 41, 42 and 43 for the first DC chopper 1, the second DC chopper 2 or the third DC chopper 3 respectively. In this case the RS flip-flop 41 receives the peak current detection signal p1 and the peak current detection signal p3 and on its output side provides the first phase difference signal ϕ1. The second RS flip-flop 42 receives on its input side the peak current detection signal p2 and the peak current detection signal p3 and on its output side provides the phase difference signal ϕ2. In addition the RS flip-flop 43 receives the peak current detection signal p3 and the peak current detection signal p1 and provides on its output side the third phase difference signal ϕ3. In accordance with the present invention the phase difference signals ϕ1, ϕ2 and ϕ3 are regulated so that between them there is a phase difference of $$\frac{360°}{3} = 120°,$$

since N=3.

The RC filter 51, 52 generates from the first phase difference signal ϕ1 the required current value signal SS1. The same then applies for RC elements 53, 54 and 55, 56.

FIGS. 4A to 4F show schematic flowcharts of an inventive regulation of two DC choppers of a two-stage DC chopper, of which the phase difference signal is not equal to 180°. As detailed above, for a two-stage DC chopper the phase difference signal of the first charge current I1 of the first DC chopper and of the second charge current of the second DC chopper would have to be 180°

$$\left(\frac{360°}{2} = 180°, \text{ with } N = 2\right).$$

In particular the two-stage DC chopper 10, as shown in FIG. 3, regulates the phase difference signal (see FIGS. 4A-4F) of the first charge current I1 and of the second charge current I2 to a value of 180° (see FIGS. 5A-5F). The inventive regulation process will now be shown qualitatively below.

FIG. 4A in this case shows the timing of the first charge current I1 and FIG. 4B shows the timing of the second charge current I2. At time t1 the second charge current I2 is at its maximum, meaning that at time t1 the second charge current I2 has the value of the second required current value signal S2. Consequently the second peak current detection signal p2 has a negative edge at time t1. At time t2 the first charge current I1 is then at its maximum, since then this corresponds to the value of the first required current value signal SS1.

The difference between times t2 and t1 identifies the actual phase difference signal φist. Furthermore the required phase difference φsoll is shown which is produced by the difference between the time t3 and the time t1. In accordance with the exemplary embodiment of FIGS. 4A to 4F the maximum of the first charge current I1 has been reached too early (φist<φsoll, or t2<t3) respectively, so that the first peak current detection signal p1 was also set too early. The result is that the first phase difference signal φ1 has a sampling ratio of more than 50% (see FIG. 4E) and the second phase difference signal φ2 a sampling ratio of less than 50%.

In accordance with the invention the first required current value signal SS1 is then regulated to a higher value because of the sampling ratio of the first phase difference signal φ1 of more than 50% (see arrow with the reference symbol P1) and the second required current value-signal SS2 is regulated to a lower value (see arrow with the reference symbol P2). As a result of this regulation a timing sequence is produced, in which the maximum of the first charge current I1 is detected later (see arrow P3) and the maximum of the second charge current I2 is detected earlier (see arrow P4).

As a consequence the result is similarly that the first peak current detection signal p1 will be set later (see arrow P5) and the second peak current detection signal p2 will be set earlier (see arrow P6).

Again the consequence is that the first phase difference signal φ1 approaches the size of 50% for the sampling ratio (see arrows P7, P8) from above and the second phase difference signal φ2 approaches the size of 50% for the sampling ration from below, until for the two phase difference signals φ1 and φ2, the sampling ratio of 50% is reached in each case.

FIGS. 5A to 5F show schematic flowcharts of the two DC choppers depicted in FIGS. 4A to 4F in the regulated state. In this case FIGS. 5E and 5F especially show that the two phase difference signals φ1 and φ2 in the regulated state each have a sampling ratio of 50% and are phase-offset by 180° to each other.

Figure 6:
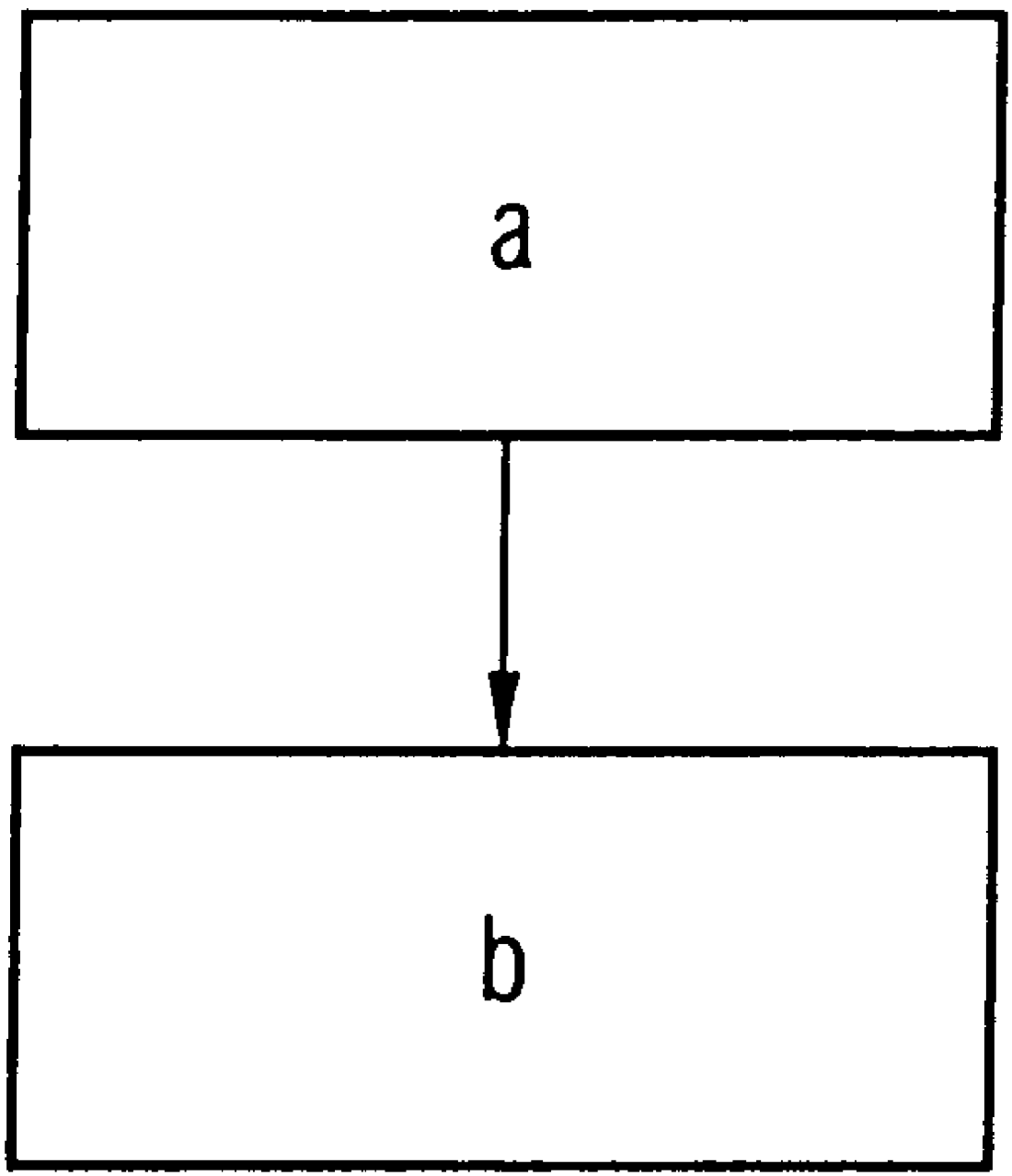
FIG. 6 is a flowchart of a preferred exemplary embodiment of the method in accordance with the invention.

FIG. 6 shows a schematic flowchart of a preferred exemplary embodiment of the method in accordance with the invention for operating a multiphase DC chopper 10, which converts an input voltage U1 of the input capacitor 6 into an output voltage U2 of an output capacitor 7.

The inventive method is explained below with reference to of the block diagram in FIG. 6. The inventive method features the following steps:

Step a:

Provision of a plurality N of DC choppers 1, 2, 3 switched in parallel between the input capacitor 6 and the output capacitor 7, with the nth DC chopper 1, 2, 3, in each case with n∈[1, ..., N], providing on its output side an oscillating nth charge current I1, I2, I3 for charging the output capacitor 7.

Step b:

Regulation in each case of a phase difference signal of two charge currents I1, I2, I3, which charge the output capacitor 7 sequentially, to a value of $$\frac{360°}{N}.$$

Although the present invention has been described in the foregoing with reference to the preferred exemplary embodiment it is not restricted to this embodiment but can be modified in a plurality of ways. For example it is conceivable, instead of the NAND gate of the regulation device, to use XOR gates. In addition it is possible, instead of the ring-back detection device, to provide a device for measurement of the charge current which calculates a ring-back detection signal depending on the zero crossing of the charge current. For phase regulation, instead of the peak current detection signals, the ring-back detection signals or the output signals of the activation circuit can be used as an alternative. A positive logic can of course also be used instead of the negative logic used in the exemplary embodiment. Furthermore the present invention is not only applicable to step-up converters but also to step-down converters.

I claim:

1. A multiphase DC chopper, comprising:
an input capacitor providing an input voltage;
an output capacitor outputting an output voltage converted from the input voltage;
a plurality N of DC choppers connected in parallel between said input capacitor and said output capacitor, with an nth one of said DC choppers, with n∈[2, ..., N], having an output outputting a nth charge current for charging said output capacitor; and
a regulation device regulating a phase difference signal of two charge currents sequentially charging said output capacitor to a value of $$\frac{360°}{N};$$

wherein said nth DC chopper has a peak current detection device providing a peak current detection signal if the nth charge current of said nth DC chopper is greater than a required current value signal predetermined for said nth DC chopper; and
wherein said regulation device includes at least a first RS flip-flop having an output and at least for said nth DC chopper provides at said output an nth phase difference signal derived from a phase difference between a nth peak current detection signal and an (n+1)th peak current detection signal or from an nth ring-back detection signal and an (n+1)th ring-back detection signal or from an nth control signal and an (n+1)th control signal.

2. The DC chopper according to claim 1, wherein said first RS flip-flop sets the nth phase difference signal to a positive logical signal level if the nth peak current detection signal has the negative logical signal level, and said first RS flip-flop sets the nth phase difference signal to a negative logical signal level if the (n+1)th peak value detection signal has the negative logical signal level.

3. The DC chopper according to claim 1, wherein:

said nth DC chopper has an inductive control element coupled to said peak current detection device and outputting the nth charge current;

said peak current detection device includes:
- a first resistor, which, depending on the nth charge current, provided by said inductive control element of said nth DC chopper, provides an actual current value signal;
- a first filter device for filtering the actual current value signal and has an output side providing a filtered actual current value signal;
- a second filter device for filtering the required current value-signal and has an output side providing a filtered required current value signal; and
- a comparator having a first input receiving the filtered required current value signal, a second input receiving the filtered actual current value signal, and an output setting a peak current detection signal to a negative logical signal level if the filtered actual current value signal is greater than the filtered required current value signal.

4. The DC chopper according to claim 3, wherein said regulation device has a required current value generator with a number of N of RC elements, in which case an nth one of said RC elements depending on the nth phase difference signal provided provides an nth required current value signal.

5. The DC chopper according to claim 4, wherein said second filter device of said peak current detection device has a series circuit of a second resistor and of a third resistor connected in parallel with a capacitor disposed between said required current value generator and ground.

6. The DC chopper according to claim 3, wherein said nth DC chopper includes:
- a controllable power switch outputting a switch voltage;
- a free-wheeling diode; and
- a ring-back detection device for measuring the switch voltage of said controllable power switch on free running of the nth charge current via said free-wheeling diode of said nth DC chopper, said ring back detection device having an output side setting a ring-back detection signal to a negative logical signal level if a measured switch voltage is less than a predetermined voltage threshold.

7. The DC chopper according to claim 6, wherein said nth DC chopper includes:
- an activation circuit having an input side receiving the peak current detection signal and the ring-back detection signal and an output side outputting a control signal, said activation circuit sets the control signal to a negative logical signal level if the peak current detection signal has the negative logical signal level and resets the control signal if the ring-back detection signal has the negative logical signal level; and
- a driver device having an input side receiving the control signal and an output side providing a switching signal for switching on said controllable power switch if the control signal has the negative logical signal level and switches said controllable power switch off if the control signal does not have the negative logical signal level.

8. The DC chopper according to claim 7, wherein said activation circuit has a second RS flip-flop with a set input receiving the peak current detection signal and a reset input receiving the ring-back detection signal.

9. The DC chopper according to claim 8, wherein said first RS flip-flop and/or said second RS flip-flop is constructed from NAND gates.

* * * * *